United States Patent

Kelley et al.

[11] Patent Number: 5,582,422
[45] Date of Patent: Dec. 10, 1996

[54] INFLATOR MOUNTING STRUCTURE

[75] Inventors: Scott A. Kelley, Algonac; Andrew J. Smydra; John P. Wallner, both of Rochester, all of Mich.; Ahmad K. Al-Amin; Timothy P. Edwards, both of Gilbert, Ariz.; Craig M. Fischer, Mesa, Ariz.; James R. Hocking, Chandler, Ariz.

[73] Assignee: TRW Vehicle Safety Systems Inc., Lyndhurst, Ohio

[21] Appl. No.: 412,957

[22] Filed: Mar. 29, 1995

[51] Int. Cl.$^6$ ................................................. B60R 21/16
[52] U.S. Cl. ................................... 280/728.2; 280/732
[58] Field of Search ........................... 280/728.1, 728.2, 280/736, 740, 741, 732

[56] References Cited

U.S. PATENT DOCUMENTS

| | | | |
|---|---|---|---|
| 4,153,273 | 5/1979 | Risko | 280/740 |
| 5,069,480 | 12/1991 | Good | 280/728.2 |
| 5,109,772 | 5/1992 | Cunningham et al. | 280/741 |
| 5,131,680 | 7/1992 | Coultas et al. | 280/737 |
| 5,149,130 | 9/1992 | Wooley et al. | 280/743.1 |
| 5,257,815 | 11/1993 | Bachelder et al. | 280/728.2 |
| 5,296,659 | 3/1994 | Potts et al. | 280/736 |
| 5,344,186 | 9/1994 | Bergerson et al. | 280/741 |
| 5,356,175 | 10/1994 | Rose et al. | 280/728.2 |
| 5,364,127 | 11/1994 | Cuevas | 280/741 |
| 5,387,009 | 2/1995 | Lauritzen et al. | 280/741 |
| 5,433,472 | 7/1995 | Green et al. | 280/732 |
| 5,454,587 | 10/1995 | Halford et al. | 280/736 |
| 5,468,012 | 11/1995 | Mihm | 280/728.2 |
| 5,484,163 | 1/1996 | Jenkins | 280/732 |

FOREIGN PATENT DOCUMENTS

| | | | |
|---|---|---|---|
| 5-69789 | 3/1993 | Japan | 280/736 |
| 5-286401 | 11/1993 | Japan | 280/728.2 |

*Primary Examiner*—Paul N. Dickson
*Attorney, Agent, or Firm*—Tarolli, Sundheim, Covell, Tummino & Szabo

[57] ABSTRACT

A vehicle occupant restraint apparatus (10) includes an inflator (20), a reaction canister (22), and first and second brackets (150,152) for mounting the inflator (20) in the reaction canister (22). The inflator has an axis (82) and first and second axially opposite end portions (96,92). The reaction canister (22) has first and second canister walls (68,70) spaced from each other along the axis (82). The first and second brackets (150,152) are contained in the reaction canister (22) between the canister walls (68,70). The first bracket (150) is fixed to the first end portion (96) of the inflator (20) and to the first canister wall (68). The second bracket (152) is fixed to the second end portion (92) of the inflator (20) and to the second canister wall (70).

15 Claims, 7 Drawing Sheets

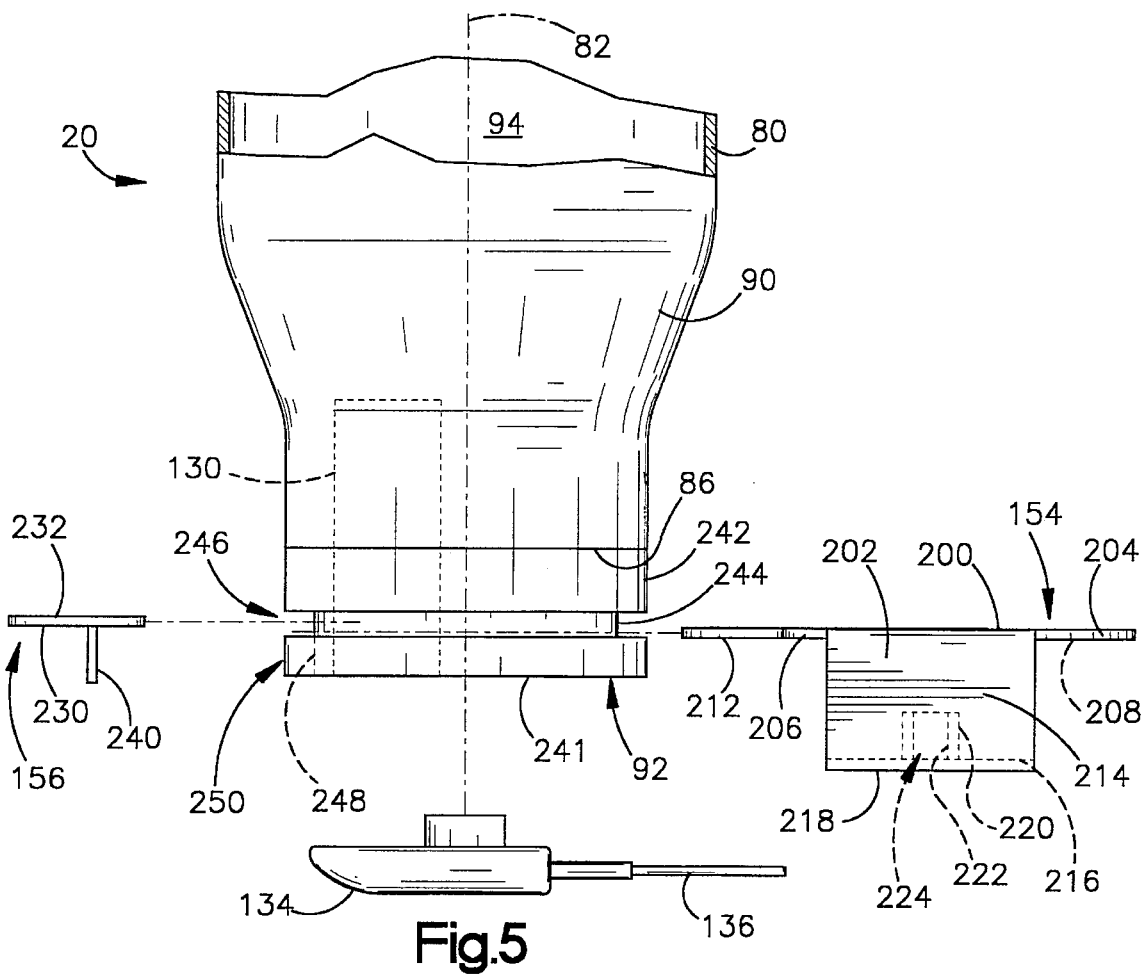
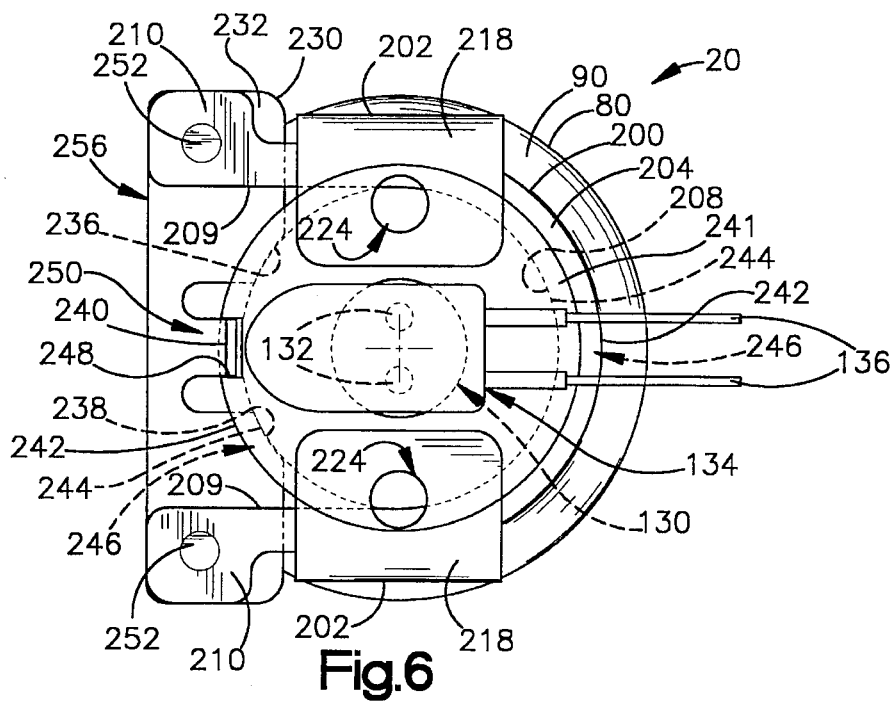

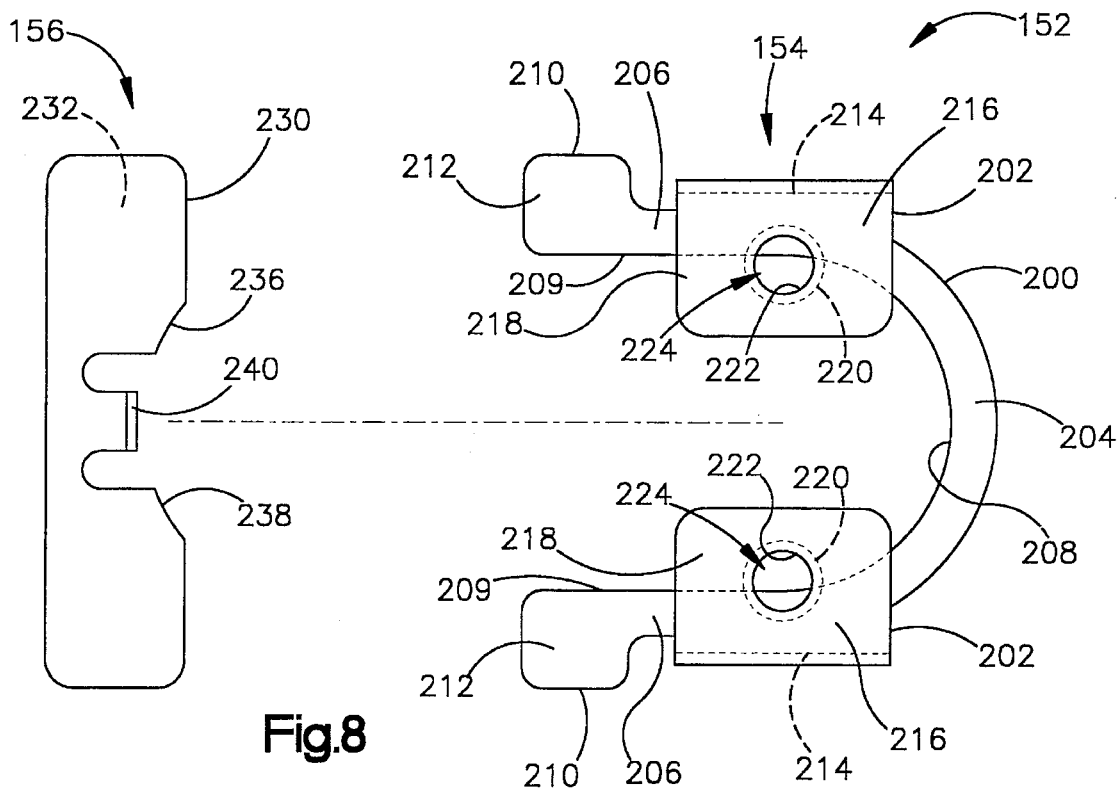
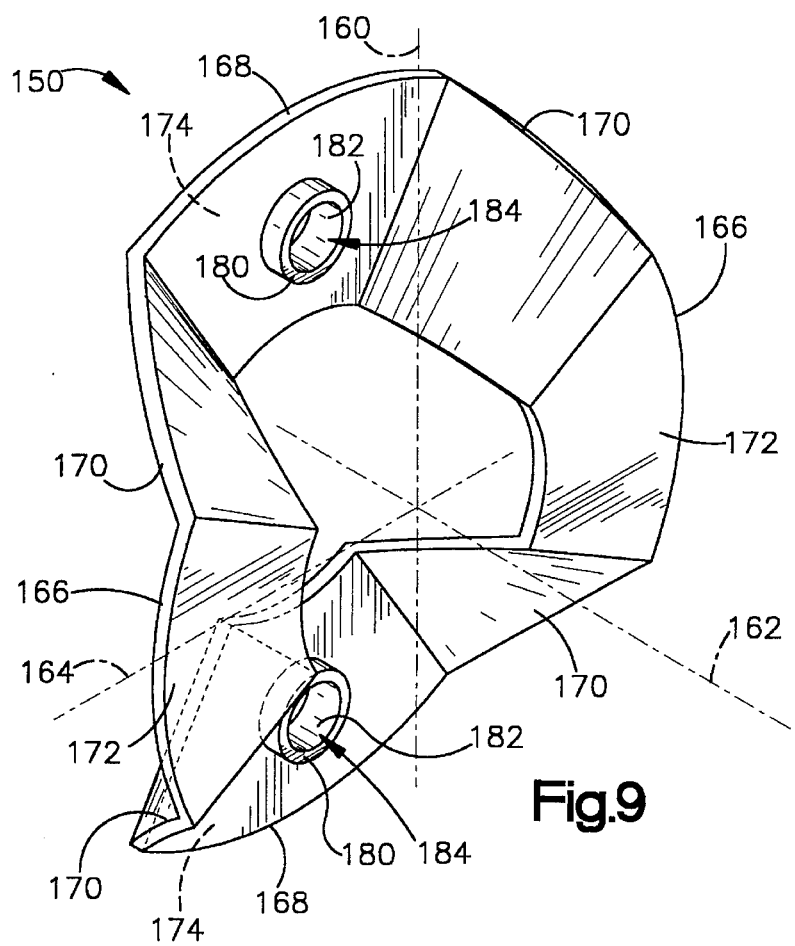

INFLATOR MOUNTING STRUCTURE

FIELD OF THE INVENTION

The present invention relates to an inflator for inflating a vehicle occupant restraint such as an air bag, and particularly relates to a mounting structure for mounting the inflator in a vehicle.

BACKGROUND OF THE INVENTION

An inflator for inflating an air bag is actuated upon the occurrence of a vehicle collision. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains an occupant of the vehicle from forcefully striking parts of the vehicle as a result of the collision.

The air bag and the inflator are typically assembled together as parts of an air bag module. In addition to the air bag and the inflator, the air bag module includes a reaction canister which contains and supports the air bag and the inflator in the vehicle. The reaction canister typically has an inner portion containing the inflator and an outer portion containing the air bag. The inflator is fixed to the inner portion of the reaction canister. The air bag is connected to the outer portion of the reaction canister, and is inflatable outward through a deployment opening in the outer portion of the reaction canister. A deployment door extends over the deployment opening to conceal the air bag and the other parts of the module from the vehicle occupant compartment.

When the inflator is actuated, the reaction canister directs the inflation fluid to flow from the inflator into the air bag. As the inflation fluid enters the air bag, it moves the air bag forcefully outward against the deployment door at the deployment opening. The deployment door is ruptured by the force of the fluid pressure in the air bag, and is moved out of the path of the air bag as the air bag inflates outward from the reaction canister through the deployment opening and into the vehicle occupant compartment.

SUMMARY OF THE INVENTION

In accordance with the present invention, an apparatus comprises an inflator, a canister, and mounting means for mounting the inflator in the canister. The inflator has an axis and first and second axially opposite end portions. The canister has first and second canister walls which are spaced from each other along the axis. The mounting means comprises first and second brackets which are contained in the canister between the canister walls. The first bracket is fixed to the first end portion of the inflator and to the first canister wall. The second bracket is fixed to the second end portion of the inflator and to the second canister wall.

In a preferred embodiment of the present invention, the inflator contains inflation fluid under pressure. The first end portion of the inflator includes initiator means for causing the inflator to emit the inflation fluid. The second end portion of the inflator includes sensor means for sensing the pressure of the inflation fluid contained in the inflator.

Additionally, the apparatus in the preferred embodiment of the present invention comprises first and second electrical connector means. The first electrical connector means connects the initiator means in an electrical circuit, and comprises a first terminal connector with a pair of lead wires. The first terminal connector is located in a space between the first end portion of the inflator and the first canister wall. The second electrical connector means connects the sensor means in an electrical circuit, and comprises a second terminal connector with a pair of lead wires. The second terminal connector is located in a space between the second end portion of the inflator and the second canister wall.

In the preferred embodiment of the present invention, the first bracket extends axially from the first end portion of the inflator to the first canister wall. The first bracket thus defines the space in which the first terminal connector is located. The second bracket extends axially from the second end portion of the inflator to the second canister wall. The second bracket thus defines the space in which the second terminal connector is located. Additionally, the first electrical connector means extends radially past the first bracket between the inflator and the first canister wall. The second terminal connector means similarly extends radially past the second bracket between the inflator and the second canister wall. The brackets thus provide clearance for the lead wires to extend from the terminal connectors at the opposite ends of the inflator to an opening through which they emerge from the rear of the canister.

Further in accordance with the present invention, the first bracket is preferably fixed to the first end portion of the inflator by a weld. The second bracket is preferably fixed to the second end portion of the inflator by a mechanical interlock which is established by cooperating parts of the inflator and the second bracket. Both brackets are preferably fixed to the canister by self-tapping screws.

BRIEF DESCRIPTION OF THE DRAWINGS

Further features of the present invention will become apparent to those skilled in the art to which the present invention relates from reading the following description with reference to the accompanying drawings, in which:

FIG. 5 is an exploded top view of parts of the apparatus of FIG. 1;

FIG. 6 is an end view showing the parts of FIG. 5 in an assembled relationship;

FIG. 8 is an exploded side view of parts shown in FIGS. 5 and 6;

FIG. 9 is a perspective view of a part shown in FIGS. and 4;

DESCRIPTION OF THE PREFERRED EMBODIMENTS

Figure 1:
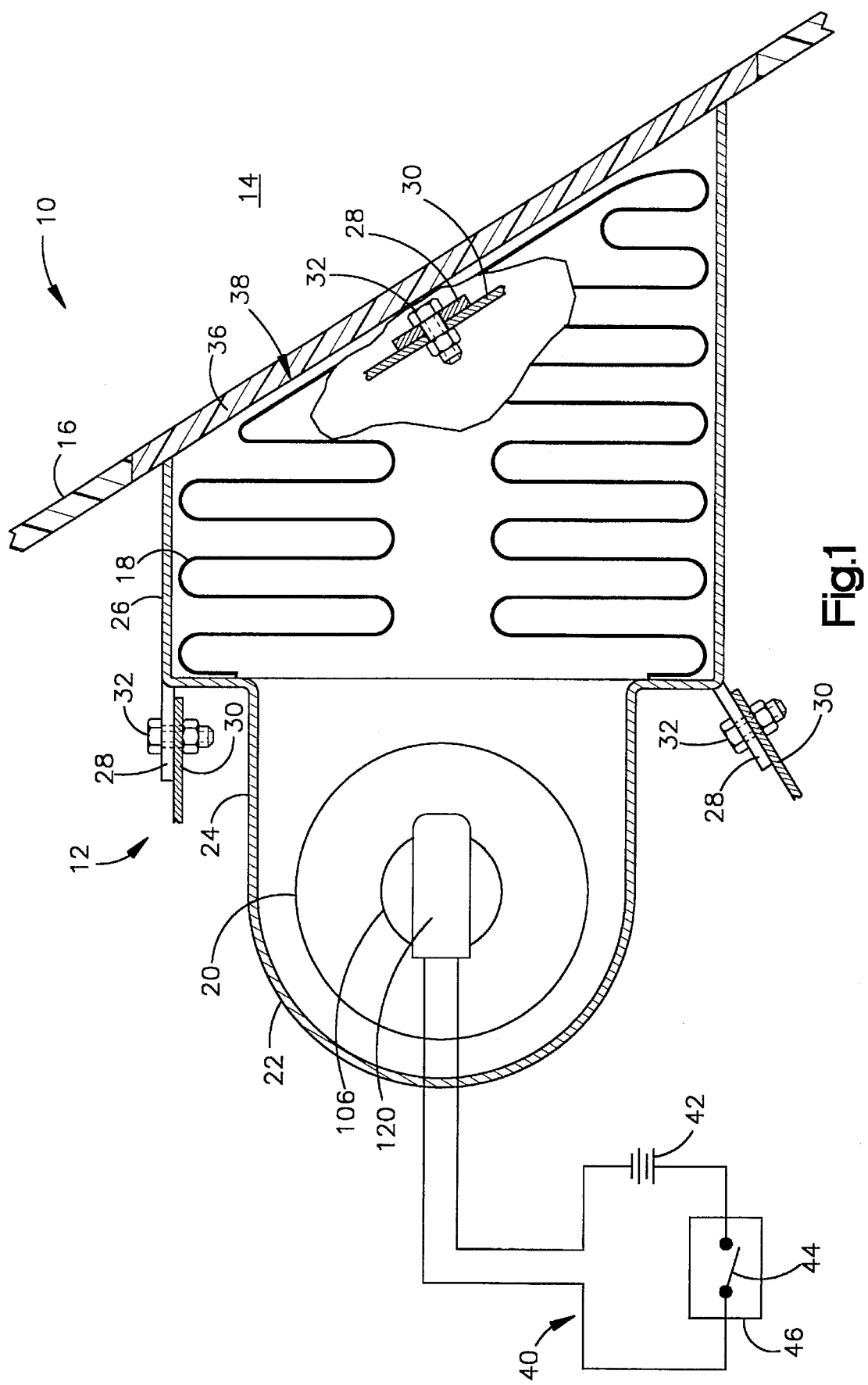
FIG. 1 is a schematic view of a vehicle occupant restraint apparatus comprising a preferred embodiment of the present invention.

As shown schematically in FIG. 1, a vehicle occupant restraint apparatus 10 comprising a preferred embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes an inflatable vehicle occupant restraint 18, which is commonly referred to as an air bag, and includes an inflator 20 for inflating the air bag 18.

The air bag module 12 further includes a reaction canister 22. The reaction canister 22 has an inner portion 24 containing the inflator 20, and has an outer portion 26 containing the air bag 18. The inflator 20 is mounted in, and is fixed to, the inner portion 24 of the reaction canister 22 in a manner described fully below. The air bag 18 is connected to the outer portion 26 of the reaction canister 22 in any suitable member known in the art. A plurality of mounting tabs 28 on the reaction canister 22 are fixed to supporting parts 30 of the instrument panel 16 by fasteners 32. The structure and arrangement of the fasteners 32, the mounting tabs 28 and the supporting parts 30 of the instrument panel 16 can vary, as known in the art.

A deployment door 36 extends over a deployment opening 38 at the outer portion 26 of the reaction canister 22. The deployment door 36 conceals the air bag 18 and the reaction canister 22 from the vehicle occupant compartment 14. As known in the art, the deployment door 36 can be constructed as a part of the air bag module 12 or, alternatively, as a part of the instrument panel 16.

As further shown schematically in FIG. 1, the inflator 20 is included in an electrical circuit 40. The electrical circuit 40 includes a power source 42, which is preferably the vehicle battery and/or a capacitor, and a normally open switch 44. The switch 44 is part of a sensor 46 which senses a condition indicating the occurrence of a vehicle collision. The collision-indicating condition may comprise, for example, sudden vehicle deceleration which occurs upon the occurrence of a collision. If the collision-indicating condition is above a predetermined threshold, it indicates the occurrence of a collision for which inflation of the air bag 18 is desired to protect an occupant of the vehicle. The sensor 46 then closes the switch 44 and the inflator 20 is actuated electrically.

When the inflator 20 is actuated, it rapidly emits a large volume of inflation fluid into the reaction canister 22. The reaction canister 22 directs the inflation fluid from the inflator 20 into the air bag 18 to inflate the air bag 18. As the air bag 18 begins to inflate, it moves forcefully outward against the deployment door 36 at the deployment opening 38. The deployment door 36 ruptures under the stress induced by the pressure of the inflation fluid in the air bag 18, and thus releases the air bag 18 to inflate outward through the deployment opening 38 and into the vehicle occupant compartment 14. A stress riser (not shown) of known construction, such as a thinned or notched section of material, is preferably included in the deployment door 36 to cause the deployment door 36 to rupture and move out of the path of the air bag 18 as the air bag 18 inflates outward from the reaction canister 22. The air bag 18 is thus inflated into the vehicle occupant compartment 14 to restrain an occupant of the vehicle from forcefully striking the instrument panel 16 or other parts of the vehicle.

Figure 2:
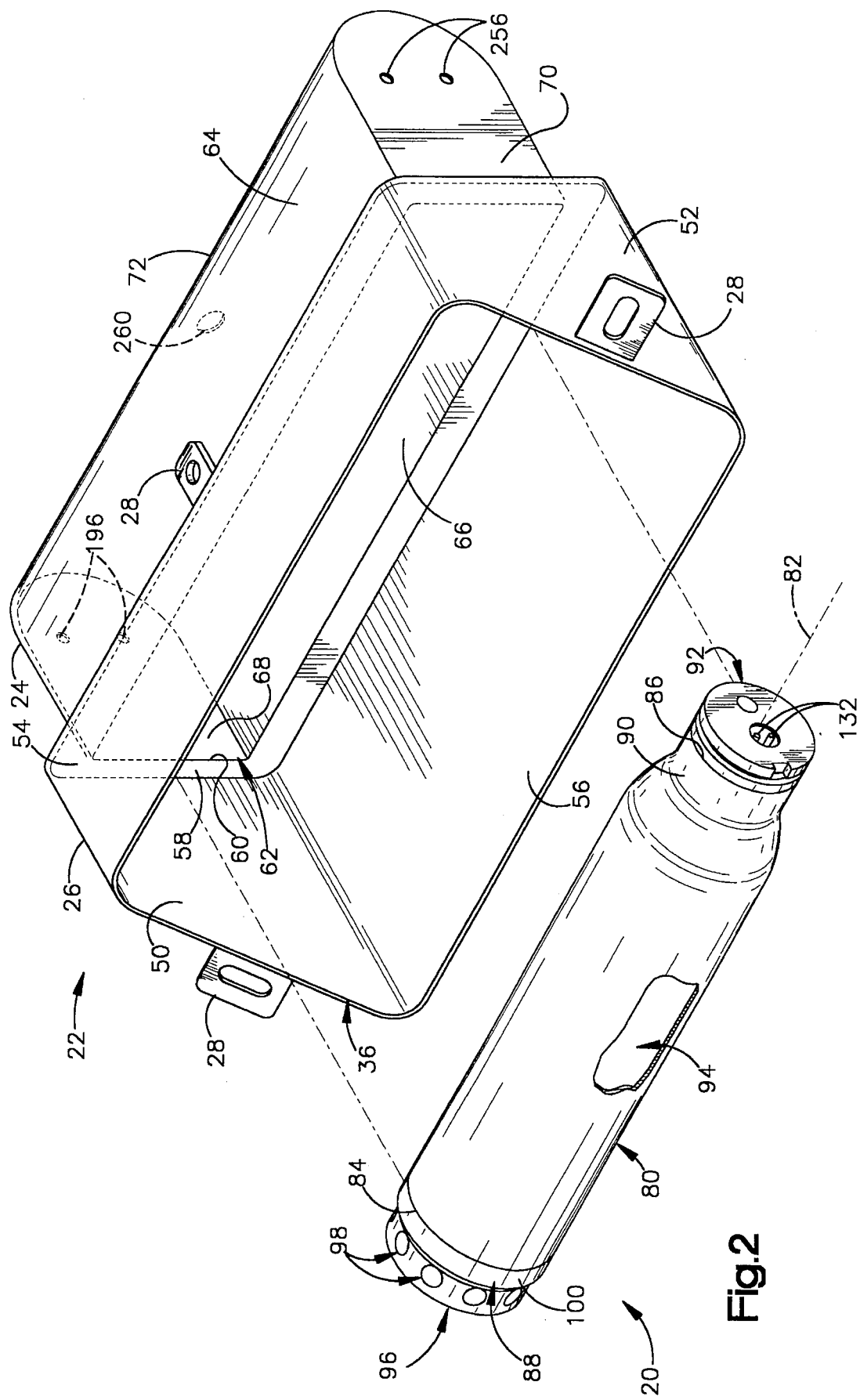
FIG. 2 is an exploded perspective view of parts of the apparatus of FIG. 1.

As shown in greater detail in FIG. 2, the outer portion 26 of the reaction canister 22 has a generally rectangular shape which is elongated horizontally. The outer portion 26 thus has first and second opposite end walls 50 and 52. The outer portion 26 further has upper and lower walls 54 and 56 extending longitudinally between the end walls 50 and 52. A rear wall 58 of the outer portion 26 extends horizontally between the end walls 50 and 52 and vertically between the upper and lower walls 54 and 56. An inner edge 60 of the rear wall 58 defines a generally rectangular opening 62 which communicates the outer portion 26 of the reaction canister 22 with the inner portion 24.

The inner portion 24 of the reaction canister 22 also is elongated horizontally, but is somewhat smaller than the outer portion 26 both horizontally and vertically. The inner portion 24 projects to the rear from the opening 62 at the outer portion 26, and also has upper and lower walls 64 and 66 extending longitudinally between a pair of opposite end walls 68 and 70. A rear wall 72 extends fully between the other walls 64, 66, 68 and 70 of the inner portion 24 to close the inner portion 24 opposite the opening 62.

The inflator 20 also is shown in greater detail in FIG. 2. The inflator 20 has an elongated, cylindrical tank wall 80 with a longitudinal central axis 82 and first and second axially opposite ends 84 and 86. An actuator assembly 88 closes the first end 84 of the tank wall 80. A tapered, tubular neck portion 90 of the tank wall 80 defines a reduced diameter of the tank wall 80 at the second end 86. A short cylindrical end cap 92 closes the second end 86.

The actuator assembly 88 and the end cap 92 define axially opposite ends of a storage chamber 94 within the tank wall 80. The storage chamber 94 is filled with a pressurized quantity of inflation fluid for inflating the air bag 18 (FIG. 1). The inflation fluid contained in storage chamber 94 may have any suitable composition known in the art, but preferably comprises a mixture of argon and helium gases. A plurality of welds (not shown) are used at appropriate locations to fix and seal the foregoing parts of the inflator 20 to each other so as to block leakage of the inflation fluid from the storage chamber 94. Additionally, an outlet manifold 96 is received over the outer end of the actuator assembly 88. The manifold 96 has a plurality of outlet openings 98 through which the inflation fluid is emitted into the reaction canister 22 when the inflator 20 is actuated.

Figure 3:
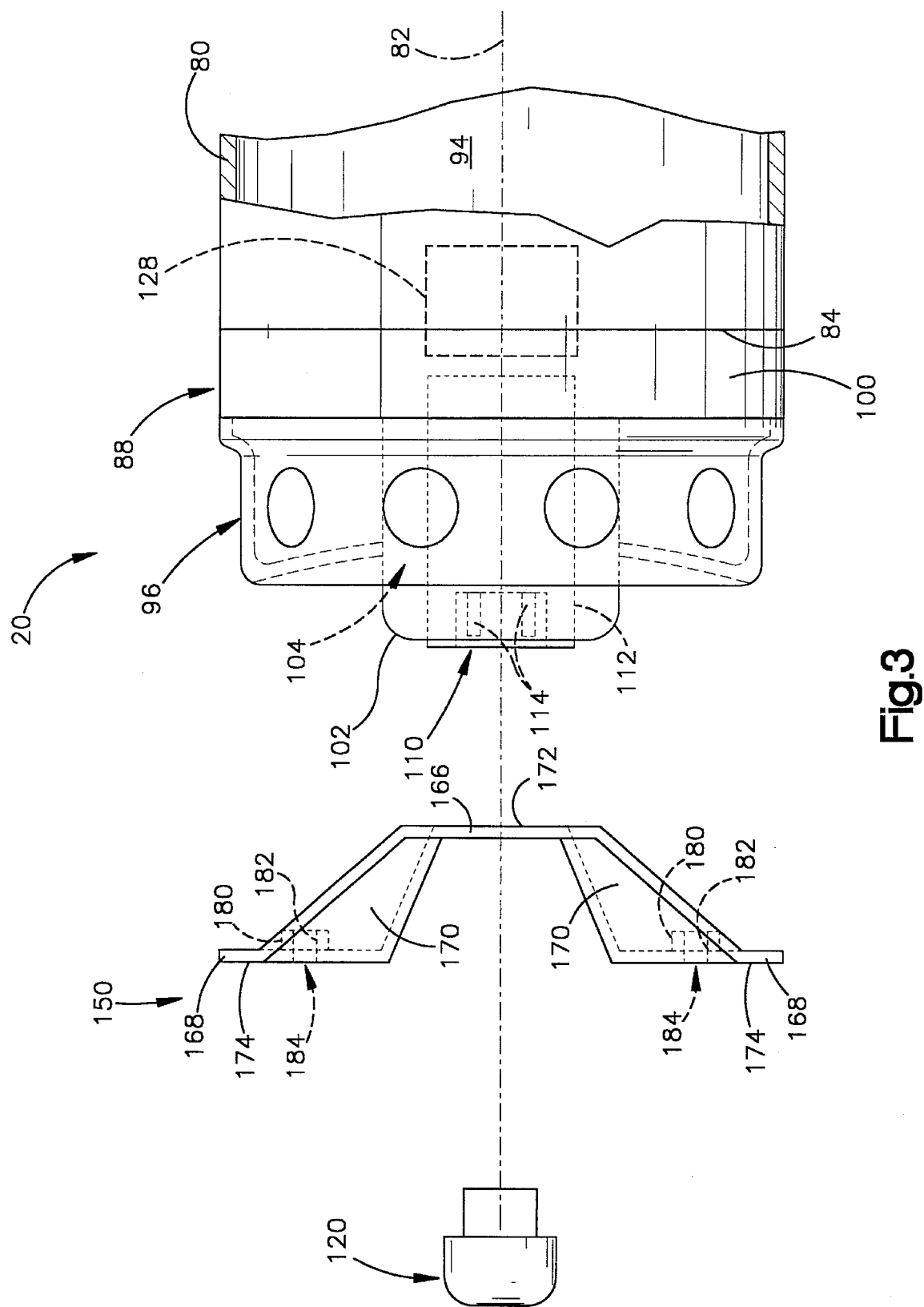
FIG. 3 is an exploded side view of parts of the apparatus of FIG. 1.

As shown in greater detail in FIG. 3, the actuator assembly 88 has a short, cylindrical rim portion 100 which abuts the first end 84 of the tank wall 80. A longer, narrower outer portion 102 of the actuator assembly 88 projects outward along the axis 82 through an opening 104 at the center of the manifold 96. An inner portion (not shown) of the actuator assembly 88 extends diametrically across the storage chamber 94 at the first end 84 of the tank wall 80 to close the storage chamber 94 at the first end 84.

As known in the art, the inner portion of the actuator assembly 88 includes a rupturable closure structure and has surfaces which define at least one outlet orifice. When the closure structure is ruptured, it releases the inflation fluid to exit the storage chamber 94 through the outlet orifice. Such parts of the actuator assembly 88 may be of any suitable construction known in the art. For example, such parts may be constructed substantially as disclosed in U.S. Pat. No. 5,364,127, assigned to TRW Inc.

Figure 4:
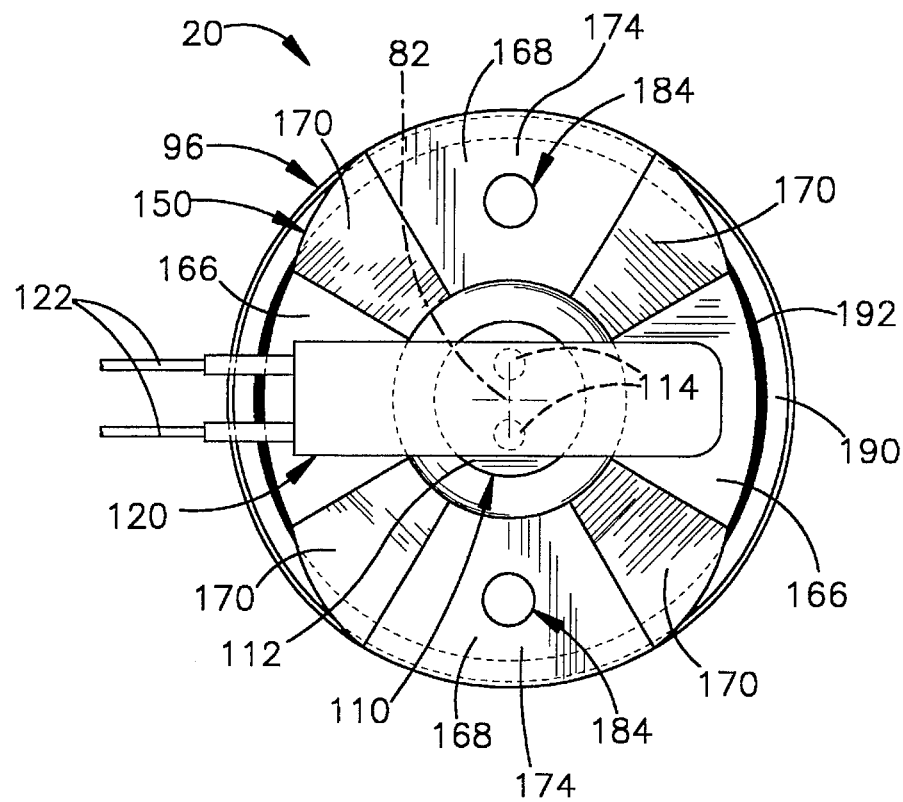
FIG. 4 is an end view showing the parts of FIG. 3 in an assembled relationship.

As further shown in FIGS. 3 and 4, the outer portion 102 of the actuator assembly 88 supports an electrically actuatable initiator 110 in a position centered on the axis 82. The initiator 110 is a known part with a cylindrical casing 112 and a pair of electrical contact pins 114. A pyrotechnic material is contained in the casing 112. The pyrotechnic material is ignited upon the passage of electric current through the initiator 110 between the contact pins 114.

The initiator 110, and hence the inflator 20, is connected in the electrical circuit 40 of FIG. 1 by a first terminal connector 120. The first terminal connector 120 also is a known part. As shown in FIG. 4, the first terminal connector 120 has a pair of lead wires 122, and is engaged with the initiator 110 so as to connect the lead wires 122 with the contact pins 114. The first terminal connector 120 thus directs electric current through the initiator 110 between the contact pins 114 to actuate the initiator 110, and thus to actuate the inflator 20, when the switch 44 (FIG. 1) in the electrical circuit 40 is closed.

When the initiator 110 is actuated, the pyrotechnic material is ignited and produces combustion products which rupture the casing 112. The combustion products are spewed outward from the casing 112 along the axis 82 toward the storage chamber 94. As a result, the closure structure at the inner portion of the actuator assembly 88 is ruptured. The inflation fluid is then released to exit the storage chamber 94 and to flow outward from the inflator 20 through the outlet openings 98 in the manifold 96, as described above.

As shown schematically in FIG. 3, a body 128 of propellent material is included in the inflator 20. The body 128 of propellent material is ignited by the combustion products from the initiator 110 and, in turn, produces additional combustion products including heat, flame, hot particles and hot gas. The combustion products from the body 128 of propellant material heat and further pressurize the inflation fluid contained in the storage chamber 94. Those combustion products may also serve to rupture the closure structure in a known manner such as, for example, in the manner shown in U.S. Pat. No. 5,364,127. The temperature and pressure of the inflation fluid in the storage chamber 94 then increase to elevated levels which cause the inflation fluid to exit the storage chamber 94 at an elevated flow rate.

A pressure switch 130 (FIGS. 5 and 6) is supported by the end cap 92 at the opposite end of the inflator 20. The pressure switch 130 extends into the storage chamber 94 through the end cap 92, and has a pair of electrical contact pins 132. The pressure switch 130 detects leakage of the inflation fluid from the storage chamber 94 by sensing the fluid pressure in the storage chamber 94, and closes to complete an electrical current path between the contact pins 132 when the fluid pressure drops to a predetermined low level. Such pressure switches are known in the art.

Figure 7:
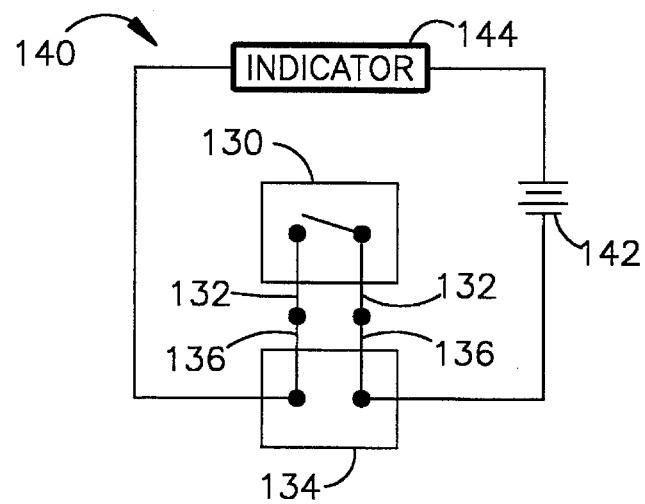
FIG. 7 is a schematic view of an electrical circuit including parts of the apparatus of FIG. 1.

A second terminal connector 134 with a pair of lead wires 136 is connected to the contact pins 132 on the pressure switch 130. The pressure switch 130 is thus connected in an electrical circuit 140 which includes the second terminal connector 134, as shown schematically in FIG. 7. Like the electrical circuit 40, the electrical circuit 140 includes a power source 142 which is preferably the vehicle battery and/or a capacitor. The electrical circuit 140 further includes an indicator 144 which may comprise a lamp on the vehicle instrument panel. When the pressure switch 130 closes upon sensing that the fluid pressure in the storage chamber 94 has dropped to the predetermined low level, the electrical circuit 140 directs electric current through the indicator 144 to actuate the indicator 144. The indicator 144 then alerts an occupant of the vehicle that the fluid pressure in the storage chamber 94 has dropped to the predetermined low level.

The vehicle occupant restraint apparatus 10 further comprises brackets for mounting the inflator 20 in the reaction canister 22. These include a first bracket 150 and a second bracket 152. As shown in FIGS. 3 and 4, the first bracket 150 is a single piece of stamped metal. As shown in FIG. 8, the second bracket 152 includes two separate bracket parts 154 and 156, each of which is a single piece of stamped metal.

The first bracket 150 is shown in FIG. 9 with reference to a vertical axis 160 and a pair of orthogonal horizontal axes 162 and 164. As thus shown in FIG. 9, the first bracket 150 is a somewhat ring-shaped part with a plurality of arcuate segments extending circumferentially around the first horizontal axis 162. The segments of the first bracket 150 include a pair of inner segments 166 and a pair of outer segments 168. The inner segments 166 are spaced from the outer segments 168 along the axis 162, and are offset from the outer segments 168 approximately 90° about the axis 162. The ring-like configuration of the first bracket 150 is completed by two pairs of connecting segments 170 which extend between the inner segments 166 and the outer segments 168.

Each inner segment 166 extends approximately 60° about the first horizontal axis 162, and has a planar inner side surface 172. The inner side surfaces 172 lie in a plane which is perpendicular to the first horizontal axis 162. Moreover, the inner side surfaces 172 are equally spaced from the first horizontal axis 162 in opposite directions that are parallel to the second horizontal axis 164. Each outer segment 168 also extends approximately 60° about the first horizontal axis 162, and has a planar outer side surface 174. The outer side surfaces 174 are equally spaced from each other in opposite directions that are parallel to the vertical axis 160. Like the inner side surfaces 172, the outer side surfaces 174 lie in a plane which is perpendicular to the first horizontal axis 162. However, the outer side surfaces 174 face along the axis 162 oppositely away from the inner side surfaces 172.

The outer segments 168 of the first bracket 150 are constructed to receive fasteners. Specifically, each outer segment 168 has a tubular projection 180 and a cylindrical inner surface 182. The cylindrical inner surfaces 182 extend horizontally from the outer side surfaces 174 to the inner ends of the tubular projections 180. Each cylindrical inner surface 182 thus defines a smooth bore 184 for receiving a self-tapping screw 186 (FIG. 10).

Figure 10:
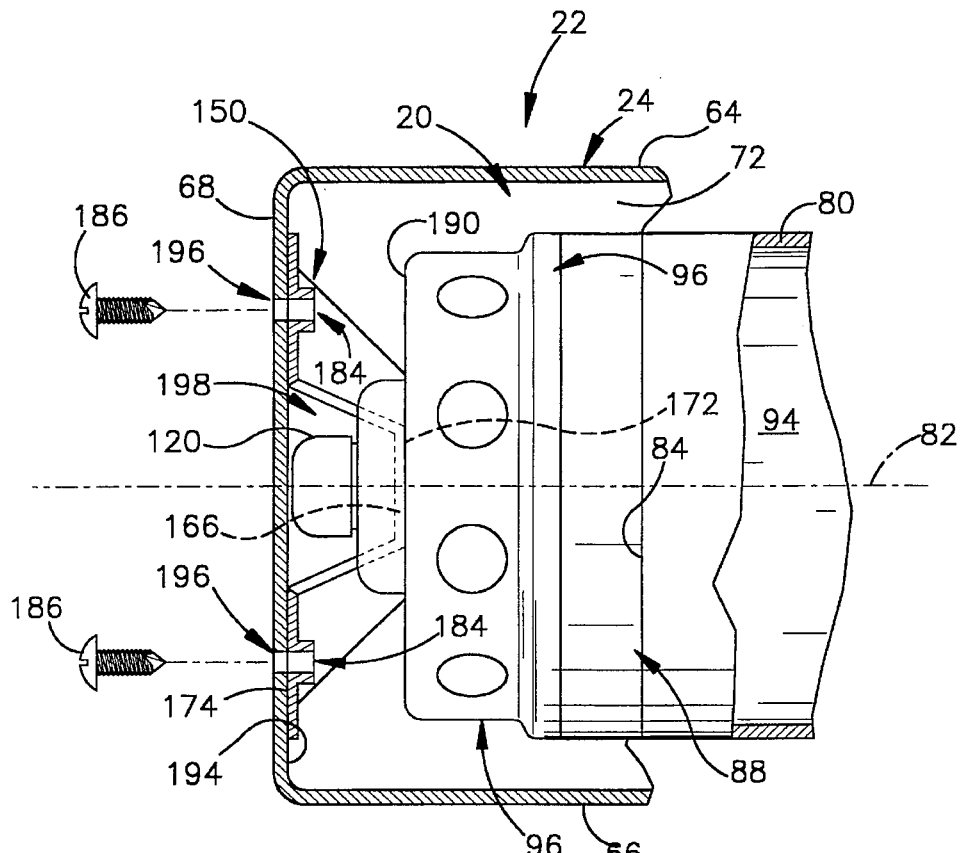
FIG. 10 is a side view, partly in section, of parts of the apparatus of FIG. 1.

As shown in FIG. 10, the first bracket 150 and the screws 186 together mount the inflator 20 on the first end wall 68 at the inner portion 24 of the reaction canister 22. The first bracket 150 engages the inflator 20, with the inner side surfaces 172 on the inner segments 166 abutting a circular end surface 190 on the manifold 96. A pair of welds 192 (FIG. 4) fix the first bracket 150 to the manifold 96 at the peripheral junctures of the abutting surfaces 172 and 190. The outer side surfaces 174 on the outer segments 168 abut an inner side surface 194 on the end wall 68. The bores 184 in the outer segments 168 are aligned with corresponding openings 196 in the end wall 68. When the screws 186 are received through the bores 184 and the openings 196, as indicated in FIG. 10, the first bracket 150 is fixed to both the inflator 20 and the end wall 68 so as to mount the inflator 20 on the end wall 68. Importantly, the first bracket 150 extends along the axis 82 from the inflator 20 to the end wall 68 to space the inflator 20 axially from the end wall 68. The first bracket 150 thus defines a space 198 for the first terminal connector 120 between the inflator 20 and the end wall 68.

As noted above, the second bracket 152 (FIG. 8) includes two separate bracket parts 154 and 156. The first bracket part 154 comprises a U-shaped frame 200 and a pair of mounting tabs 202. The frame 200 has an arcuate base 204 and a pair of legs 206 extending from the base 204. The base 204 has an arcuate inner edge surface 208 with a constant radius of curvature. Each leg 206 has a linear inner edge surface 209, and further has an enlarged end portion 210 with a planar inner side surface 212.

Figure 11:
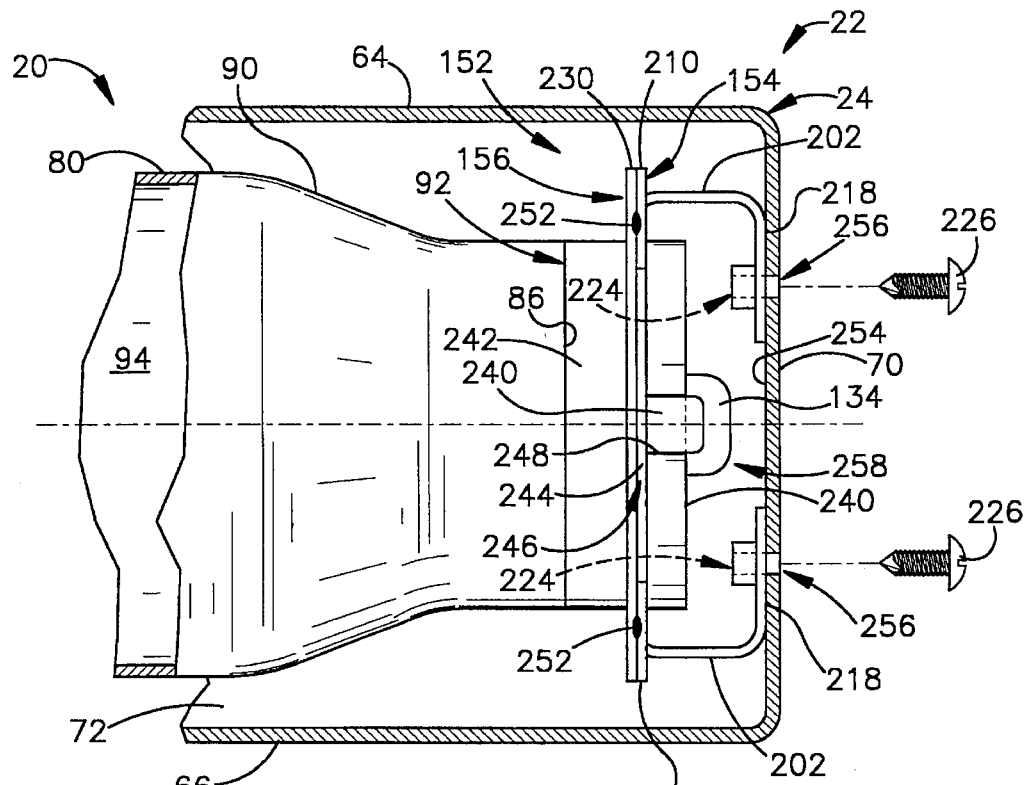
FIG. 11 also is a side view, partly in section, of parts of the apparatus of FIG. 1.

Each mounting tab 202 on the first bracket part 154 has a first section 214 and a second section 216. The first section 214 projects outward from a corresponding leg 206 at a location between the base 204 and the enlarged end portion 210 of the leg 206. The second section 216 has a planar outer side surface 218, and extends partially across the frame 200 from the first section 214 toward the other mounting tab 202 at the other side of the frame 200. Each of the second sections 216 of the mounting tabs 202 further has a tubular projection 220 and a cylindrical inner surface 222. Like the cylindrical inner surfaces 182 on the first bracket 150, the cylindrical inner surfaces 222 on the second bracket 152 define smooth bores 224 for receiving self-tapping screws 226 (FIG. 11).

The second bracket part 156 has a generally rectangular base 230 with a planar outer side surface 232. The base 230 further has a pair of arcuate edge surfaces 236 and 238. The arcuate edge surfaces 236 and 238 on the second bracket part 156 have a common radius of curvature which is equal to the radius of curvature of the arcuate edge surface 208 on the first bracket part 154. A relatively small rectangular tab portion 240 of the second bracket part 156 projects outward from the base 230 at a location between the arcuate edge surfaces 236 and 238.

As shown in FIG. 5, the end cap 92 at the second end of the inflator 20 has a planar outer end surface 241, a cylindrical peripheral surface 242, and a cylindrical recessed surface 244. The recessed surface 244 defines the bottom of a groove 246, and has a radius equal to the radius of curvature of the edge surfaces 208, 236 and 238 on the bracket parts 154 and 156. The groove 246 extends radially inward from the peripheral surface 242, and extends circumferentially entirely around the axis 82. An additional recessed surface 248 of the end cap 92 defines a notch 250. The notch 250 extends axially from the groove 246 to the outer end surface 241. The end cap 92 is thus constructed to receive the bracket parts 154 and 156 as shown in FIGS. 5 and 6.

Specifically, the first bracket part 154 is received partially in the groove 246 in the end cap 92. The base 204 of the first bracket part 154 extends circumferentially within the groove 246, with the inner edge surface 208 on the base 204 abutting the recessed surface 244 at the bottom of the groove 246. The legs 206 of the first bracket part 154 extend partially through the groove 246, with the linear inner edge surfaces 209 extending tangentially outward from the recessed surface 244 at the bottom of the groove 246.

The second bracket part 156 also is received partially in the groove 246. The arcuate edge surfaces 236 and 238 on the second bracket part 156 abut the recessed surface 244 at the bottom of the groove 246. The tab 240 on the second bracket part 156 is received in the notch 250. Additionally, the planar inner side surfaces 212 on the legs 206 of the first bracket part 154 overlie the planar outer side surface 232 on the base 230 of the second bracket part 156. A pair of welds 252 fix the legs 206 to the base 230 where the planar side surfaces 212 and 232 adjoin each other. The first and second bracket parts 154 and 156 are thus fixed to each other to define the second bracket 152 as a unified structure which includes the two separate bracket parts 154 and 156.

When the first and second bracket parts 154 and 156 are fixed to each other in engagement with the end cap 92 in the foregoing manner, the welds 252 prevent the bracket parts 154 and 156 from moving radially away from the end cap 92. The tab 240 on the second bracket part 156 fits in the notch 250 so as to block the bracket parts 154 and 156 from rotating about the axis 82 relative to the end cap 92. Both of the bracket parts 154 and 156 are received partially within the groove 244 and, therefore, cannot be removed axially from the end cap 92. Accordingly, the end cap 92 and the bracket parts 154 and 156 establish a mechanical interlock which fixes the second bracket 152 to the end cap 92 without the use of a separate fastening structure, such as a weld, between the second bracket 152 and the end cap 92.

As shown in FIG. 11, the second bracket 152 and the screws 226 together mount the inflator 20 on the second end wall 70 at the inner portion 24 of the reaction canister 22. The planar outer side surfaces 218 on the mounting tabs 202 abut an inner side surface 254 on the end wall 70. The bores 224 in the mounting tabs 202 are aligned with corresponding openings 256 in the end wall 70. When the screws 226 are received through the bores 224 and the openings 256, as indicated in FIG. 11, the second bracket 152 is fixed to both the inflator 20 and the end wall 70 so as to mount the inflator 20 on the end wall 70. The second bracket 152 extends along the axis 82 from the inflator 20 to the end wall 70 to space the inflator 20 axially from the end wall 70. The second bracket 152 thus defines a space 258 for the second terminal connector 134 between the inflator 20 and the end wall 70.

In the preferred embodiment of the present invention shown in the drawings, the lead wires 122 and 136 extending from the first and second terminal connectors 120 and 134 are directed outward from the reaction canister 22 through a common opening 260 (FIG. 2) at the center of the rear wall 72. As shown in FIG. 4, the first bracket 150 provides clearance for the first terminal connector 120 and the lead wires 122 to extend radially outward from the initiator 110 past the first bracket 150. The first terminal connector 120 and the lead wires 122 thus extend radially past the first bracket 150 between the inflator 20 and the first inner end wall 68 of the reaction canister 22 (FIG. 10). As shown in FIGS. 6 and 11, the second bracket 152 similarly provides clearance for the second terminal connector 134 and the lead wires 136 to extend radially past the second bracket 152 between the inflator 20 and the second inner end wall 70. The brackets 150 and 152 thus provide clearance for the lead wires 122 and 136 to extend within the reaction canister 22 from the opposite ends of the inflator 20 to the opening 260. A grommet (not shown) of known construction is preferably used to guide the lead wires 122 and 136 outward through the opening 260.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

an inflator comprising a source of inflation fluid, said inflator having an axis and first and second axially opposite end portions;

a canister having first and second canister walls spaced from each other along said axis;

mounting means for mounting said inflator in said canister between said canister walls, said mounting means comprising first and second brackets contained in said canister between said canister walls;

said first bracket being fixed to said first end portion of said inflator and to said first canister wall, said second bracket being fixed to said second end portion of said inflator and to said second canister wall;

said second bracket and said second end portion of said inflator comprising cooperating means for establishing a mechanical interlock which prevents removal of said second bracket from said second end portion of said inflator; and said second bracket including separate bracket parts which engage said second end portion of said inflator in positions adjoining each other, said bracket parts being fixed to each other in said adjoining positions.

2. Apparatus as defined in claim 1 wherein said second end portion of said inflator has means for defining a groove, said bracket parts having adjoining portions which are fixed to each other, said bracket parts further having non-adjoining portions which extend within said groove between said adjoining portions.

3. Apparatus as defined in claim 2 wherein said adjoining portions of said bracket parts are fixed to each other by welds.

4. Apparatus as defined in claim 3 wherein said second bracket is fixed to said second canister wall by fasteners.

5. Apparatus comprising:

an inflatable vehicle occupant restraint;

an inflator containing inflation fluid under pressure, said inflator having an axis and first and second axially opposite end portions, said first end portion of said inflator including initiator means for causing said inflator to emit said inflation fluid, said second end portion of said inflator including sensor means for sensing said pressure;

canister means for containing and supporting said restraint and said inflator in a vehicle, said canister means having first and second canister walls spaced from each other along said axis, each of said first and second canister walls having a closed portion extending diametrically across said axis;

first electrical connector means for connecting said initiator means in an electrical circuit, said first electrical connector means comprising a first terminal connector located in a first space between said first end portion of said inflator and said first canister wall;

second electrical connector means for connecting said sensor means in an electrical circuit, said second electrical connector means comprising a second terminal connector located in a second space between said second end portion of said inflator and said second canister wall; and mounting means including first and second brackets contained entirely inside said canister between said canister walls, said first and second brackets for mounting said first and second end portions of said inflator on said first and second canister walls, respectively;

said first bracket extending axially from said first end portion of said inflator to said first canister wall to define said first space, said second bracket extending axially from said second end portion of said inflator means to said second canister wall to define said second space.

6. Apparatus as defined in claim 5 wherein said first electrical connector means extends radially past said first bracket between said inflator and said first canister wall, said second electrical connector means extending radially past said second bracket between said inflator and said second canister wall.

7. Apparatus as defined in claim 5 wherein said first and second canister walls have first and second inner side surfaces, respectively, said first and second inner side surfaces facing each other along said axis, said first bracket having a first outer side surface abutting said first inner side surface, said second bracket having a second outer side surface abutting said second inner side surface.

8. Apparatus as defined in claim 8 wherein said second bracket and said second end portion of said inflator comprise cooperating means for establishing a mechanical interlock which prevents removal of said second bracket from said second end portion of said inflator, said cooperating means comprising axially opposed surfaces which abut each other so as to block movement of said second bracket axially relative to said inflator.

9. Apparatus as defined in claim 5 wherein said mechanical interlock blocks movement of said second bracket axially, radially, and circumferentially relative to said inflator.

10. Apparatus comprising:

an inflatable vehicle occupant restraint;

an inflator containing inflation fluid under pressure, said inflator having an axis and first and second axially opposite end portions, said first end portion of said inflator including initiator means for causing said inflator to emit said inflation fluid, said second end portion of said inflator including sensor means for sensing said pressure;

canister means for containing and supporting said restraint and said inflator in a vehicle, said canister means having first and second canister walls spaced from each other along said axis;

first electrical connector means for connecting said initiator means in an electrical circuit, said first electrical connector means comprising a first terminal connector located in a first space between said first end portion of said inflator and said first canister wall;

second electrical connector means for connecting said sensor means in an electrical circuit, said second electrical connector means comprising a second terminal connector located in a second space between said second end portion of said inflator and said second canister wall;

mounting means including first and second brackets for mounting said first and second end portions of said inflator on said first and second canister walls, respectively;

said first bracket extending axially from said first end portion of said inflator to said first canister wall to define said first space, said second bracket extending axially from said second end portion of said inflator means to said second canister wall to define said second space;

said second bracket and said second end portion of said inflator comprising cooperating means for establishing a mechanical interlock which prevents removal of said second bracket from said second end portion of said inflator; and said second bracket including separate bracket parts which engage said second end portion of said inflator in positions adjoining each other, said bracket parts being fixed to each other in said adjoining positions.

11. Apparatus as defined in claim 10 wherein said second end portion of said inflator has means for defining a groove, said bracket parts having adjoining portions which are fixed to each other, said bracket parts further having non-adjoining portions which extend within said groove between said adjoining portions.

12. Apparatus as defined in claim 11 wherein said adjoining portions of said bracket parts are fixed to each other by welds, said second bracket being fixed to said second canister wall by fasteners.

13. Apparatus comprising:

an inflator comprising a source of inflation fluid, said inflator having an axis and first and second axially opposite end portions;

a canister having first and second canister walls spaced from each other along said axis;

mounting means for mounting said inflator in said canister between said canister walls, said mounting means comprising first and second brackets contained in said canister between said canister walls;

said first bracket being fixed to said first end portion of said inflator and to said first canister wall, said second bracket being fixed to said second end portion of said inflator and to said second canister wall;

said first bracket defining a space extending axially between said first end portion of said inflator and said first canister wall, said inflator including initiator means for causing said inflator to emit said inflation fluid, said apparatus further comprising electrical connector means for connecting said initiator means in an electrical circuit, said electrical connector means comprising a terminal connector located in said space defined by said first bracket, said first bracket providing clearance for said electrical connector means to extend radially past said first bracket between said inflator and said first canister wall.

14. Apparatus comprising:

an inflator comprising a source of inflation fluid, said inflator having an axis and first and second axially opposite end portions;

a canister having first and second canister walls spaced from each other along said axis;

mounting means for mounting said inflator in said canister between said canister walls, said mounting means comprising first and second brackets contained in said canister between said canister walls;

said first bracket being fixed to said first end portion of said inflator and to said first canister wall, said second bracket being fixed to said second end portion of said inflator and to said second canister wall;

said second bracket defining a space extending axially between said second end portion of said inflator and said second canister wall, said inflator containing inflation fluid under pressure and including sensor means for sensing said pressure, said apparatus further comprising electrical connector means for connecting said sensor means in an electrical circuit, said electrical connector means comprising a terminal connector located in said space defined by said second bracket, wherein said second bracket provides clearance for said electrical connector means to extend radially past said second bracket between said inflator and said second canister wall.

15. Apparatus comprising:

an inflator comprising a source of inflation fluid, said inflator having an axis and first and second axially opposite end portions;

a canister having first and second canister walls spaced from each other along said axis;

mounting means for mounting said inflator in said canister between said canister walls, said mounting means comprising first and second brackets contained in said canister between said canister walls;

said first bracket being fixed to said first end portion of said inflator and to said first canister wall, said second bracket being fixed to said second end portion of said inflator and to said second canister wall;

said first canister wall having a closed portion extending diametrically across said axis and across said first end portion of said inflator, said first bracket defining a space extending axially between said first end portion of said inflator and said first canister wall, said inflator including initiator means for causing said inflator to emit said inflation fluid, said apparatus further comprising electrical connector means for connecting said initiator means in an electrical circuit, said electrical connector means comprising a terminal connector located in said space defined by said first bracket.

* * * * *

UNITED STATES PATENT AND TRADEMARK OFFICE
CERTIFICATE OF CORRECTION

PATENT NO.   : 5,582,422
DATED        : December 10, 1996
INVENTOR(S)  : Scott A. Kelley, et. al.

It is certified that error appears in the above-indentified patent and that said Letters Patent is hereby corrected as shown below:

Column 10, line 1, change "8" to --5--.

Signed and Sealed this

Third Day of June, 1997

Attest:

BRUCE LEHMAN

Attesting Officer

Commissioner of Patents and Trademarks